Sept. 11, 1962  C. J. MERCHANT  3,052,986
ASTRONOMICAL INSTRUMENT AND EQUATORIAL MOUNT THEREFOR
Filed Sept. 29, 1958  2 Sheets-Sheet 1
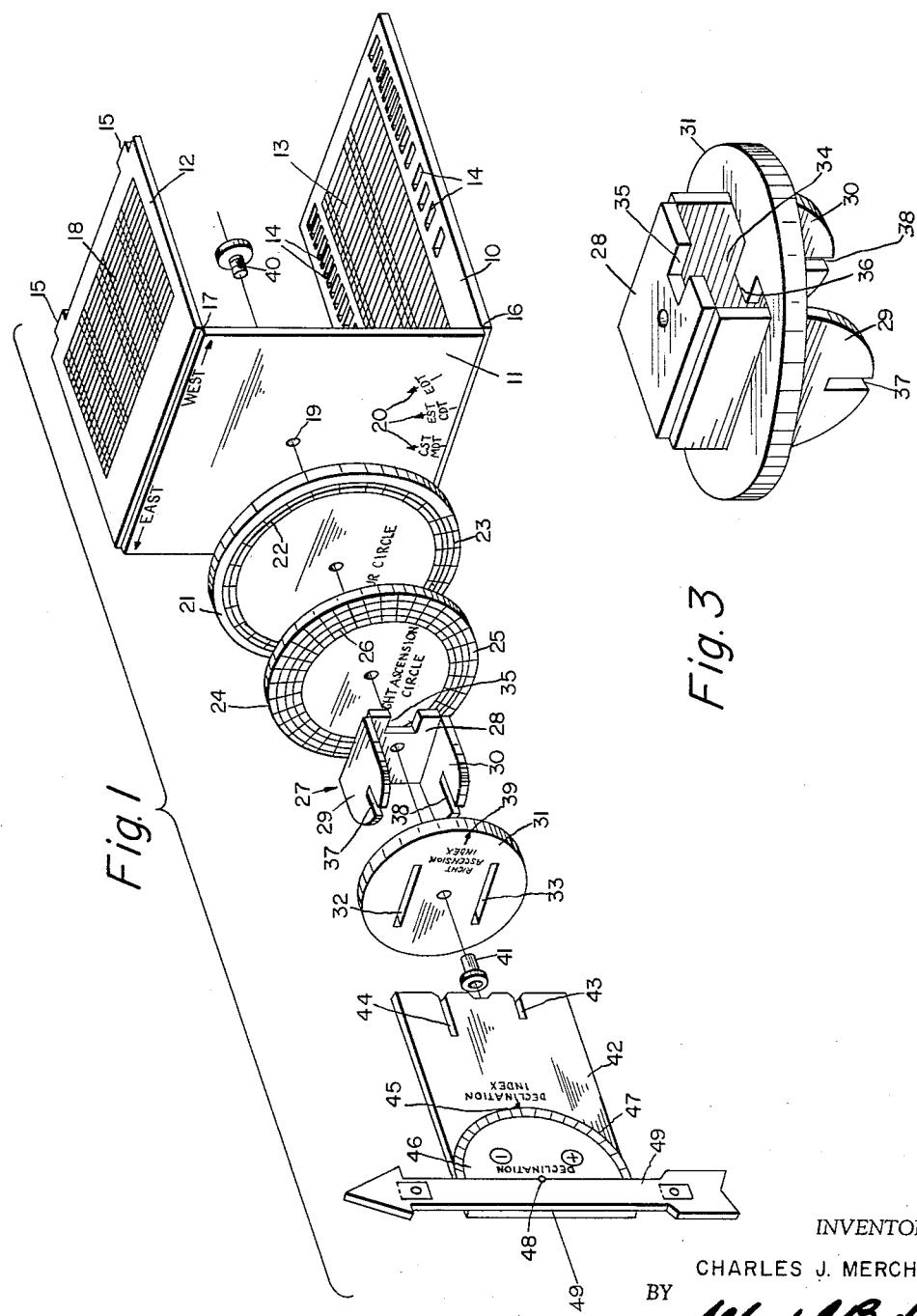
INVENTOR.
CHARLES J. MERCHANT
BY
*Alfred G Body*
ATTORNEY Sept. 11, 1962     C. J. MERCHANT     3,052,986
ASTRONOMICAL INSTRUMENT AND EQUATORIAL MOUNT THEREFOR
Filed Sept. 29, 1958     2 Sheets-Sheet 2
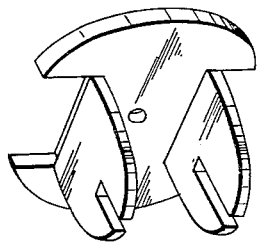
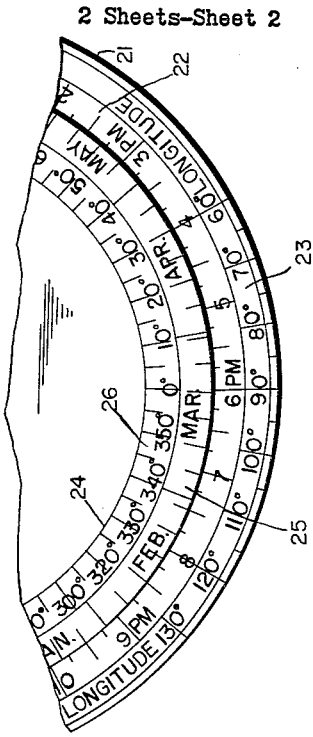
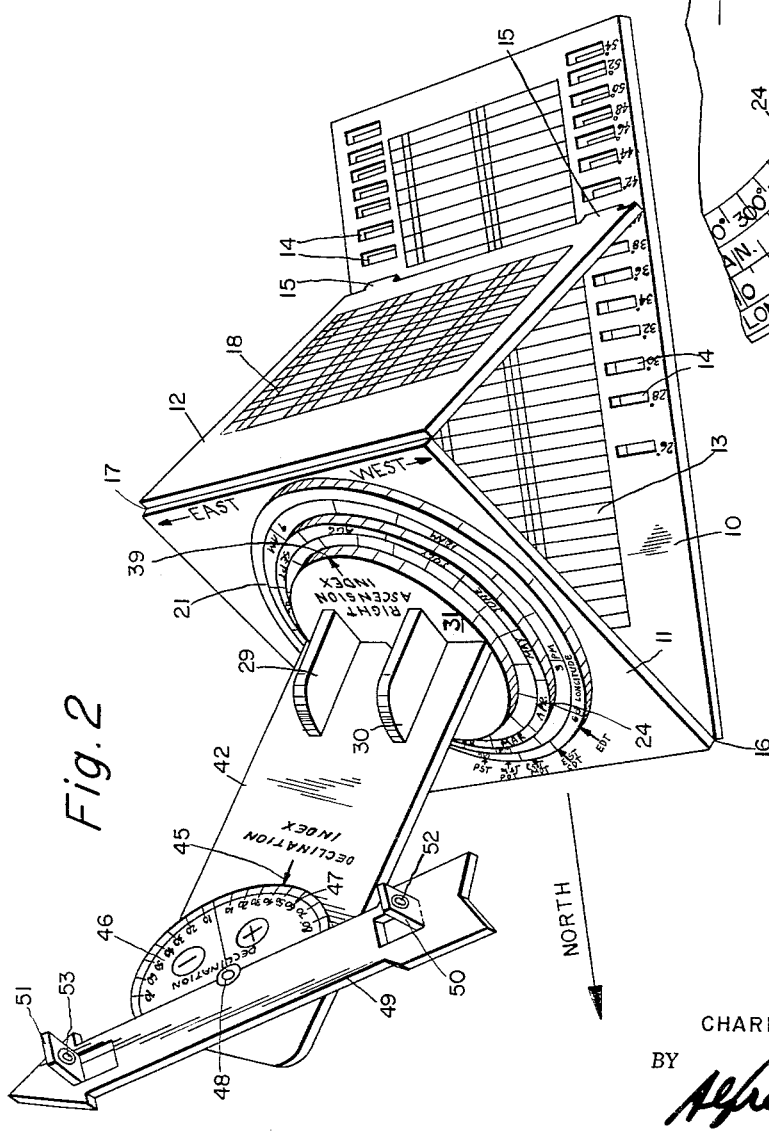
INVENTOR.
CHARLES J. MERCHANT
BY Alfred C Body
ATTORNEY United States Patent Office 3,052,986
Patented Sept. 11, 1962

3,052,986
ASTRONOMICAL INSTRUMENT AND EQUATORIAL MOUNT THEREFOR
Charles J. Merchant, Cleveland, Ohio, assignor to The A. C. Gilbert Company, New Haven, Conn., a corporation of Maryland
Filed Sept. 29, 1958, Ser. No. 763,997
10 Claims. (Cl. 33—61)

This invention relates to an astronomical instrument for locating any selected star or constellation in the sky and for various other purposes, and to an equatorial mount incorporated in such an instrument.

The recent increase in popular interest in astronomy, due in part at least to the development of artificial earth satellites and the prospect of travel by humans into outer space, has emphasized the need for an astronomical instrument designed for use by the novice to assist him in locating any selected star or constellation in the sky.

The present invention relates to such an instrument which is so simple and convenient to use that even the beginner may readily master its basic operation for locating stars and constellations. At the same time, it has sufficient versatility to be of continuing interest and usefulness as the user's knowledge of the celestial universe broadens.

It is an object of the present invention to provide a novel and improved instrument for locating stars and constellations in the sky.

It is also an object of this invention to provide such an instrument which has sufficient versatility to enable it to be used for other purposes, such as telling time by the stars, as a sundial, as solar compass, and telling the time of sunrise and sunset.

Another object of this invention is to provide an improved star pointer of novel and simplified collapsible construction which facilitates its storage and shipment and enables its manufacture at low cost.

A further object of this invention is to provide a novel and improved star pointer which has novel provision for adjustment to the latitude of the user.

An important aspect of the present invention is concerned with the provision of a novel equatorial mount which is adjustable automatically to correct for the longitude of its location, as well as the date and time of viewing. Knowing the date, the time (in terms of standard time) and his longitude, the user may orient the right ascension circle of the instrument so that it corresponds to the sky by performing a few simple manipulations of this instrument. The present invention contains a built-in arrangement which computes these corrections for longitude, date and time automatically, thereby obviating the need for a sidereal clock or the need for the user to compute the sidereal time. This is particularly advantageous to the novice, to whom a sidereal clock would not ordinarily be available and who might be hesitant to attempt converting his standard time to sidereal time.

Therefore, it is also an object of this invention to provide a novel and improved equatorial mount for an astronomical viewing device which has provision for automatic adjustment to the sidereal time of the viewer at the moment of observation.

Other objects and advantages of this invention will be apparent from the following detailed description of a presently preferred embodiment thereof, which is illustrated in the accompanying drawings.

In the drawings:

FIGURE 1 is an exploded perspective view of the present instrument;

FIGURE 2 is a perspective view of the instrument completely assembled;

FIGURE 3 is a fragmentary bottom perspective view showing the right ascension index circle and the declination post support in the present instrument partially assembled;

FIGURE 4 is a fragmentary enlarged plan view showing portions of the hour circle and the right ascension circle in the present instrument; and FIGURE 5 is a perspective view of an integral right ascension index circle and declination post support which may be substituted in place of the FIG. 3 sub-assembly in the present instrument.

Referring to the drawings, the present instrument comprises adjustable base structure having three flat, hingedly interconnected segments 10, 11 and 12.

The bottom segment 10 is intended to rest on a horizontal surface, with its longitudinal axis oriented toward the earth's North Pole, as indicated in FIG. 2. A chart 13 listing the latitude and longitude of the principal cities of the United States and Canada is provided on the top face of the bottom segment 10. In one practical embodiment, this chart gives the latitude to the nearest even degree and the longitude to the nearest degree. At each side the bottom segment 10 is formed with a series of spaced openings 14 for selectively receiving tabs 15 on segment 12 of the base. These openings 14 are calibrated in accordance with the even-numbered latitudes from 26° to 54°.

The second base segment 11 at its lower end is hingedly connected at 16 to one end of the bottom segment 10. Segment 11 constitutes the equatorial plate in the present instrument.

The third segment 12 of the base is hinged at 17 to the upper end of segment 11 and extends downward therefrom to the bottom base segment 10, where its tabs 15 are selectively receivable in an aligned pair of the latitude slots 14. The third segment 12 on its front face is provided with a chart 18 which gives the declination and right ascension of the principal constellations and stars.

The purpose of this three-segment construction of the base is to position its equatorial plate segment 11 in alignment with the equatorial plane of the celestial sphere. The calibrated latitude slots 14 are so located that when the tabs 15 are received in a particular aligned pair of the slots 14 the equatorial plate segment 11 extends at an angle to the horizontal which is the complement of the latitude designation of that pair of slots. Thus, for example, with the tabs 15 received in the latitude 40° slots 14, the equatorial plate segment 11 extends at an angle of 50° to the horizontal. With this arrangement, when the bottom segment 10 of the base lies in a horizontal plane with its longitudinal axis oriented toward the earth's North Pole, as shown, the segment 11 will extend in alignment with the equatorial plane of the celestial sphere, provided the user has set the tabs 15 in the slots 14 for the latitude of the place where the instrument is being used.

Desirably, the entire base composed of segments 10, 11 and 12 is of one-piece heavy cardboard construction, with the cardboard being slotted part way through at 16 and 17 to provide the hinge connections between the segments. The entire base can be folded substantially flat, with the segments 11 and 12 extending coplanar with one another and overlying the bottom segment 10.

Thus, it will be apparent that the three segment base 10—12 in the present invention provides a simplified and convenient arrangement for readily adjusting to the latitude of the observer. At the same time its collapsible construction enables the base to be taken down and folded flat when not in use, or for shipment.

Referring to FIG. 1, the equatorial plate 11 of the base is formed with a centrally disposed hole 19. Toward its bottom edge the equatorial plate 11 carries five time zone indices in the form of arrows 20, which are spaced apart at 15° intervals around the arc of a circle which has hole 19 as its center. These arrows are labelled, respectively: "PST" (Pacific Standard Time); "MST" (Mountain Standard Time) and "PDT" (Pacific Daylight Time); "CST" (Central Standard Time) and "MDT" (Mountain Daylight Time); "EST" (Eastern Standard Time) and "CDT" (Central Daylight Time); "EDT" (Eastern Daylight Time). The middle arrow ("CST"—"MDT") is located at the lowermost point on this circle.

An hour circle in the form of a disc 21 directly overlies the equatorial plate 11 and is rotatable about the axis of the latter's central opening 19. This disc is flat and has a circular periphery. Toward its periphery the disc 21 carries a circular time or hour scale 22, which is evenly calibrated in terms of the hours of the day and each five minutes thereof, each hour taking up 15° of the circle. The hours progress clockwise about the periphery of the disc. An arcuate longitude scale 23 on disc 21 extends partially around the hour scale 22. This longitude scale runs from 60° to 130° and covers the range of longitude for the United States and Canada. Each 15° of longitude on the scale 23 takes up 15° of the arc of its circle about the center of disc 21. The longitude markings on scale 23 also progress clockwise. The 90° longitude mark on scale 23 is aligned with the 6 p.m. mark on scale 22.

A right ascension circle in the form of a flat, circular disc 24 overlies the hour circle 21 and is rotatable about the same axis as the latter. Together with disc 21, disc 24 is stacked against the equatorial plate 11. At its periphery the right ascension circle carries a circular scale 25 evenly calibrated in terms of the months and days of the year. It also carries an inner circular scale 26 calibrated evenly in degrees from 0° to 360°. Both scales 25 and 26 progress counter-clockwise. The 0° marking on scale 26 is aligned with the date March 21 (the vernal equinox) on scale 25. The date scale 25 on the right ascension circle 24 extends closely adjacent to the time scale 22 on the hour circle 21, so that these scales may be lined up with one another by turning the right ascension circle with respect to the hour circle.

The foregoing arrangement of the scales on the hour circle 21 and the right ascension circle 24 provide a simplified arrangement for automatically correcting the setting of the right ascension circle to compensate for the longitude, date and time of viewing. As such, it is useful on any equatorial mount, such as an equatorial mount for a telescope.

Any equatorial mount has:

(1) a polar axis, which is the axis of rotation for the whole mount about a line which is adjusted to be parallel to the earth's axis;

(2) a declination axis, which is an axis of rotation perpendicular to the polar axis; and (3) a sighting device, such as a pointer or telescope, mounted perpendicular to the declination axis.

In order to find a selected celestial object by the use of an equatorial mount, assuming that the mount has been properly oriented, the right ascension circle must first be adjusted to indicate the correct sidereal time for the viewer's location, or, what is the same thing, the right ascension circle must be adjusted so that the right ascension of the meridian equals the sidereal time at the moment of observation. When this adjustment has been made, any desired celestial body may be found by setting the equatorial mount to the right ascension and the declination of that body.

Setting the right ascension can constitute a seemingly difficult problem to the novice, who would not have available a sidereal clock, but only a clock or watch which tells standard time.

In order to determine the sidereal time from standard time, it is necessary to provide a correction for the viewer's longitude (which reduces standard time to local mean time) and a correction for the date (which reduces local mean time to sidereal time).

The present instrument incorporates within itself the foregoing easily manipulated arrangement for automatically performing these computations, so that the right ascension circle 24 is automatically oriented to correspond to the sky.

The right ascension scale 26 is shown as being calibrated in degrees. However, if desired, it may be calibrated in hours and minutes (0° being midnight).

A declination post-like structure, indicated generally at 27, is provided overlying the right ascension circle 24 and projecting in outstanding relation thereto with its longitudinal axis perpendicular to the equatorial plate 11. This post structure at its proximal end comprises a flat base wall 28 and a pair of upstanding opposite sides 29 and 30. In one practical embodiment this support is in the form of a single flat piece of heavy cardboard having slots cut partially therethrough at the junctures of the sides 29, 30 with the base portion 28, so that the sides may be positioned perpendicular to the base portion. The post structure has a proximal mounted end portion and an opposite distal end portion.

Post structure 27 is provided with a right ascension index pointer 39 directed laterally of its length carried on a right ascension index circle in the form of a flat circular disc 31 provided with slots 32 and 33, which pass the sides 29 and 30, respectively, of the declination post support. As shown in FIG. 3, the right ascension index circle 31 at its bottom face is formed with an open recess 34, which is shaped to snugly receive the base portion 28 of the declination post support. A recess 35 in one edge of the base portion 28 of the declination post support snugly receives an inwardly protruding segment 36 on the right ascension index circle so that these parts can be assembled only one way. When fully assembled, the base portion 28 of the declination post structure is disposed completely in the recess 34 in the right ascension index circle, and these parts have their bottom faces extending flush with each other, overlying the right ascension index circle 24.

The arm 29 of the declination support is formed with a short slot 37, which is open at the outer edge of this arm. The opposite arm 30 is formed with a longer slot 38, which is open at the outer edge of this arm.

The right ascension index circle 31 is provided with index mark 39 at its periphery midway between the slots 32 and 33, and in alignment with the middle of the recess 35 in the underlying base portion 28 of the declination post support.

A two-piece post fastener, in the form of a threaded member 40 and a hollow member 41, extends through the aligned central openings in the equatorial plate 11 on the base, the hour circle 21, the right ascension circle 24, the declination post support 27 and the right ascension index circle 31 whereby to serve as means pivotally connecting the latter parts to the plate.

The hour circle 21 is rotatable on the equatorial plate 11 so that the appropriate longitude on scale 23 on the former may be positioned selectively in alignment with the proper time zone arrow 20 on the latter.

The right ascension circle 24 underlies the base wall 28 of the proximal end portion of post-structure 27 and is rotatable with respect to the hour circle 21 so that the proper date on the former's scale 25 may be aligned with the time on the latter's scale 22.

The right ascension index circle 31 and the declination post structure 27 are rotatable as a unit with respect to the right ascension circle 24 to bring the right ascension index mark 39 on the former into registration with the right ascension on the latter's scale 26 for the star or constellation being sought.

The declination index post comprises a flat, relatively wide member 42 which has spaced short and long slots 43 and 44, respectively, open at its bottom edge. The slots fit over the sides 30 and 29, respectively, on the declination post support 27 at the slots 38 and 37 therein. When the parts are fully assembled (FIG. 2) the bottom edge of the post 42 engages the upper face of the right ascension index circle 31. Obviously, because of the arrangement of the long and short slots in the declination index post 42 and the declination post support 27, these parts can interfit in this manner only one way. In this position of the parts the declination index post 42 lies in a plane which is perpendicular to the respective planes of the arms 29 and 30 of the declination post support, as well as perpendicular to the equatorial plate 11 on the base. Therefore, the central longitudinal axis of the declination index post is oriented toward the celestial north pole.

The declination index post 42 carries an index mark 45 which is aligned with its central longitudinal axis.

The declination circle member 46, having a semicircular periphery 47 at its inner end, is pivotally mounted at 48 on the declination index post 42. The pivot 48 extends perpendicular to the central longitudinal axis of post 42. The declination circle member 46 is calibrated at its semi-circular periphery in terms of declination, from 0° at its center to plus and minus 90° at opposite sides thereof.

A sighting device, here shown as a pointer 49, is connected to the outer end of the declination circle member 46 and lies in the same plane as the latter in alignment with the −90° and +90° marks on the latter's scale 47. A pair of spaced tabs 50 and 51, which have sighting openings 52 and 53 therein, are connected integrally to pointer 49 and are adapted to extend perpendicular thereto, as shown in FIG. 2.

If desired, the pointer 49 may be replaced, or supplemented, by a telescope pointing in the same direction.

In the use of this instrument, the base is adjusted for the user's latitude, as already described, to position its equatorial plate 11 in alignment with the celestial equatorial plane. With the remaining parts assembled as described, the declination index post 42 has its central longitudinal axis oriented toward the north celestial pole, i.e., the base of the instrument is pointed north, as in FIGURE 2.

The longitude of the user on scale 23 (on the hour circle 21) is brought into alignment with the time zone arrow 20 (on the equatorial plate 11) for the user's time zone.

The date on scale 25 (on the right ascension circle 24) is brought into alignment with the time on scale 22 (on hour circle 21).

The right ascension index mark 39 (on the right ascension index circle 31) is brought into registration with the right ascension for the star or constellation being sought on scale 26 (on the right ascension circle 24).

Finally, the declination of the star or constellation being sought on scale 47 (on the declination circle 46) is brought into registration with the declination index mark 48 (on the declination index post 42).

The pointer 49 now points toward the star or constellation being sought, which may be viewed by sighting along the pointer.

It has been found practical to make all of the parts of the instrument, except the pivot 48 for the pointer and the post fastener 40, 41, out of heavy cardboard, although other material might be used, if desired. The knock-down construction of the instrument enables it to be disassembled readily into a substantially flat condition, so that it takes up a minimum of space for storage or shipment.

Obviously, there is no difficulty whatever in adjusting the instrument to locate any desired star or constellation.

Instead of the two-piece construction shown in FIG. 3, the right ascension index circle and the declination post support may be in the form of an integral one-piece structure, as shown in FIG. 5.

Also, in place of the arrangement shown, the date calibrations may be put on the same disc which carries the longitude calibrations (the lower disc 21 in FIGS. 1, 2 and 4) and the hour calibrations put on the right ascension circle (24 in FIGS. 1, 2 and 4). In such event, if desired, the right ascension circle may have a single circular scale calibrated in hours. In the use of this instrument the time of viewing on this circular scale is aligned with the date on the date scale, and the index mark on the overlying right ascension index circle 31 is brought into registration with the right ascension (in hours) of the selected star.

*Other Uses*

In addition to its use as a star or constellation pointer the present instrument is adapted for various other uses, as described hereinafter.

*Telling the Time of Rising and Setting of a Star*

For this use the instrument need not be oriented. All that is necessary is that it be positioned on a horizontal surface.

The tabs 15 are positioned in the corresponding latitude slots 14 for the viewer's location. The viewer's longitude on scale 23 (on the hour circle 21) is aligned with the appropriate time zone arrow 20. Then the hour circle 21 is fastened by tape to the equatorial plate 11.

The right ascension index mark 39 (on right ascension index circle 31) is set to the right ascension of the star on scale 26 (on the right ascension circle 24). The right ascension index circle 31 then is taped to the right ascension circle 24.

The declination circle 46 is turned to position the declination of the star on its scale 47 in registration with the declination index mark 45.

Then, with the instrument resting on a horizontal surface, the right ascension circle 24 is rotated (carrying with it the right ascension index circle 31) until the index arrow 39 on the right ascension index circle 31 is horizontal at the "East" side of the equatorial plate 11. This index arrow 39 now is in the same position as if it were pointed at the desired star just rising above the horizon. The time of rising of this star can then be found on the time scale 22 (on the hour circle 21) coinciding with the desired date on the date scale 25 (on the right ascension circle 24).

The time of setting of any star on any desired date can be found in the same manner, except that the index arrow 39 is pointed horizontal at the "West" side of the equatorial plate 11.

*As a Solar Compass*

To use the present instrument as a solar compass it is necessary only to know the latitude of the place of observation and the declination of the sun on the date of observation. This latter can be found in "Nautical Almanac" or the "American Ephemeris."

The tabs 15 are set in the latitude slots 14 for the user's latitude. The sights 50, 51 on the pointer 49 are opened out. The declination circle 46 is turned about its axis 48 until the declination of the sun on that date on scale 47 is aligned with the index mark 45.

Then the instrument is positioned resting on a horizontal surface in the sunlight, with the declination index post 42 pointing in the general direction of north.

*Telling the Time of Sunrise and Sunset*

The present instrument can be used to tell the time of sunrise and sunset, provided the declination and right ascension of the sun on the date in question are known. These are given in the "Nautical Almanac" and the "American Ephemeris."

The instrument is first adjusted as described above for use as a solar compass.

Then, a small piece of white paper is held a few inches below the lower one of the two sights 50, 51 on pointer 49 to catch the shadows of the two sights. The right ascension index circle 31 is rotated until the pointer 49 points as nearly as possible at the sun. This can be judged by the sunlight passing through the sights 50, 51. When the pointer 49 is pointing directly at the sun the shadows of the two sights will line up exactly. This cannot be achieved unless the instrument is facing exactly north. By moving the base of the instrument around and simultaneously rotating the right ascension index circle 31, the correct position may be reached.

For accurate results, this procedure should be done before 10:00 a.m. or after 2:00 p.m.

*Telling Time by the Stars*

Standard time can be determined accurately with the present instrument from a known visible star.

First, the instrument is properly oriented to position the equatorial plate 11 aligned with the celestial equatorial plane, as already described. Then, the user's longitude on scale 23 is aligned with the appropriate time zone arrow 20. The declination and right ascension of the known star are set up, using scale 47 and index mark 45 for the declination and scale 26 and index mark 39 for the right ascension. With the instrument so adjusted, using the sights on pointer 49, the user turns the right ascension circle 46 (without moving the hour circle 21 or the position of the right ascension index 39 on the right ascension circle) until the pointer arrow points to the known star. Standard time can be read directly from the time scale 22 where it coincides with the date of observation on the date scale 25.

*As a Sundial*

The present instrument can be used as an accurate sundial which will tell either local sun time or standard time.

Local sun time is the time shown by a conventional sundial and differs from standard time in that noon always occurs when the sun is due south. In some localities local sun time may differ by as much as two hours from standard time.

To find local sun time, the tabs 15 are set in the proper slots 14 for the user's latitude. Then, the hour circle 21 is positioned so that longitude 90° on its scale 23 registers with the "CST" arrow 20 on the equatorial plate 11. Preferably, the hour circle then is taped to the equatorial plate.

The instrument then is oriented on a horizontal surface, with the declination post 42 pointing north. This can best be done by finding the sun's declination and using the instrument as a solar compass, as already described.

Disregarding the right ascension circle 24, the right ascension index circle 31 is rotated until the pointer 49 points at the sun. This is done by turning the right ascension index circle 31 until the width of the shadow of the declination index post 42 is at its narrowest.

Disregarding the right ascension circle 24, determine the time on the scale 22 on the hour circle 21 at which the right ascension index arrow 39 is pointing. This is the local sun time.

To find standard time, the tabs 15 are set in the proper latitude slots 14. The user's longitude on scale 23 on the hour circle 21 is set to the local time zone arrow 20. Preferably, the hour circle 21 then is taped to the equatorial plate 11.

The right ascension index mark 39 on the right ascension index circle 31 is set at the right ascension of the sun for the day of observation on scale 26 on the right ascension circle 24. The right ascension index circle 31 then is taped to the right ascension circle 24.

The instrument is then oriented, pointing north. The right ascension circle 24 is turned until the shadow of the declination index post 42 is at its narrowest. Then the correct standard time can be read on the scale 22 on the hour circle 21 coinciding with the observation date on the date scale 25 on the right ascension circle.

While there has been described herein and illustrated in the accompanying drawings a particular presently preferred embodiment of this invention, it is to be understood that various modifications, omissions and refinements which depart from the disclosed embodiment may be adopted without departing from the spirit and scope of this invention.

I claim:

1. An astronomical instrument comprising a horizontal base having a plurality of latitude slots therein, an equatorial plate hingedly attached at its lower end to said base and extending upward angularly therefrom, a support member hingedly attached to the upper end of said equatorial plate and extending downward therefrom to the base, said support member at its lower end having a tab shaped and dimensioned to be removably seated selectively in one of said latitude slots in the base, said latitude slots being calibrated in accordance with the degrees of latitude and being positioned in succession along the base away from the hinged attachment of the equatorial plate thereto such that the equatorial plate is disposed at an angle to the horizontal which is the complement of the angle calibration of the latitude slot in which the tab is received, a right ascension circle overlying said equatorial plate and rotatable parallel thereto, adjustable means calibrated in terms of longitude, date and standard time for the adjustment of said right ascension circle to the sidereal time, a right ascension index circle rotatably overlying said right ascension circle, a declination index post extending up from said right ascension index circle perpendicular thereto, said declination index post being coupled to said right ascension index circle to turn therewith, a declination circle rotatably mounted on said post for angular adjustment about an axis perpendicular thereto, and a sighting device connected to said declination circle.

2. The instrument of claim 1, wherein said equatorial plate and said support member are adapted to lie flat over said base when said tab is removed from the latitude slot, and said declination index post is detachably coupled to said right ascension circle.

3. The instrument of claim 1, wherein said adjustable means comprises an hour circle rotatable on said equatorial plate, said equatorial plate having an index mark thereon, said hour circle having a longitude scale on its periphery positioned to register selectively with said index mark on the equatorial plate, said hour circle having a circular hour scale which progressses in the same direction as said longitude scale, said hour scale having its 6 p.m. calibration registering with the 90° calibration on the longitude scale and with each advance of one hour on the hour scale being equal to a 15° advance on the longitude scale, said right ascension circle overlying said hour circle and being rotatable with respect thereto, said right ascension circle having a circular date scale at its periphery positioned for selective registration with the hour scale on the hour circle, the dates on the date scale progressing opposite to the direction in which the hour scale progresses, and said right ascension circle having a circular right ascension scale thereon which has its 0° calibration registering with the date March 21 on the date scale and which progresses in the same direction as the date scale.

4. In an astronomical instrument, the combination of, an equatorial plate, adjustable base structure adapted to support and position said plate in substantial parallelism with the celestial equatorial plane at different latitudes, a post-like structure having a proximal end portion and a distal end portion with its intervening length disposed in outstanding relation to said equatorial plate and its longitudinal axis perpendicular thereto, said post-like structure carrying a right ascension index pointer directed laterally of its length, a rotatable disc carrying right ascension graduations and underlying the proximal end of said post with said right ascension graduations disposed for registration with said index pointer, means pivotally connecting said disc and a mounted end portion of said structure to said equatorial plate in a manner to turn about said axis of said structure relatively to said plate, and a sighting device swingably mounted on the distal end portion of said structure remote from said plate in a manner to be tiltable to selective angles of declination relatively to said plate and to said disc.

5. In an astronomical instrument the combination defined in claim 4, together with a time circle turnable about the said pivotal connecting means between the said equatorial plate and the said ascension graduated disc and carrying a time scale registrable with the said right ascension graduations, and stationary time zone indices stationed on the said equatorial plate for register with said time scale.

6. In an astronomical instrument, the combination defined in claim 4, in which a longitudinal portion of the said post-like structure comprises a stiff flat faced strip of sheet material, and the said mounted end portion of said structure comprises a flat faced base wall rigid with the said structure and extending transversely of the length thereof in face-to-face relation to the said right ascension disc.

7. In an astronomical instrument, the combination defined in claim 6, in which the said pivotal connecting means comprises a stud extending through the said flat base wall of the said mounted end portion of the said post-like structure.

8. In an astronomical instrument, the combination defined in claim 6, in which the said flat base wall of the said mounted end portion of the said post-like structure carries the said right ascension index pointer.

9. In an astronomical instrument, the combination defined in claim 4, in which the said sighting device comprises a stiff flat faced strip of sheet material pivotally connected to the said distal portion of the said length of the said post-like structure remote from the said mounted end portion thereof.

10. An astronomical instrument comprising a horizontal base having a plurality of latitude slots therein, an equatorial plate hingedly attached at its lower end to said base and extending upward angularly therefrom, a support member hingedly attached to the upper end of said equatorial plate and extending downward therefrom to the base, said support member at its lower end having a tab shaped and dimensioned to be removably seated selectively in one of said latitude slots in the base, said latitude slots being calibrated in accordance with the degrees of latitude and being positioned in succession along the base away from the hinged attachment of the equatorial plate thereto such that the equatorial plate is disposed at an angle to the horizontal which is indicated by the angle calibration of the latitude slot in which the tab is received, a right ascension circle overlying said equatorial plate and rotatable parallel thereto, adjustable means calibrated in terms of longitude, date and standard time for the adjustment of said right ascension circle to the sidereal time, a right ascension index member rotatably overlying said right ascension circle, a declination index post extending up from said right ascension index member perpendicular thereto, said declination index post being coupled to said right ascension index member to turn therewith, a declination circle mounted on said post, and a sighting device connected to said declination circle for angular adjustment about an axis perpendicular to said post.

References Cited in the file of this patent
UNITED STATES PATENTS

| | | |
|---|---|---|
| 205,485 | Holmes | July 2, 1878 |
| 1,336,010 | Wingate | Apr. 6, 1920 |
| 1,852,166 | Kaster | Apr. 5, 1932 |
| 2,412,130 | Crouch | Dec. 3, 1946 |
| 2,524,706 | Johanson et al. | Oct. 3, 1950 |
| 2,637,108 | Viesturs | May 5, 1953 |
| 2,711,589 | Stock | June 28, 1955 |

FOREIGN PATENTS

| | | |
|---|---|---|
| 214,034 | Great Britain | Apr. 17, 1924 |
| 700,983 | Great Britain | Dec. 16, 1953 |